(12) United States Patent
Nagura et al.

(10) Patent No.: US 8,387,979 B2
(45) Date of Patent: Mar. 5, 2013

(54) SHEET FEEDING APPARATUS, DOCUMENT READING APPARATUS AND METHOD FOR FEEDING SHEET

(75) Inventors: Yasukazu Nagura, Shizuoka (JP); Toru Uchida, Shizuoka (JP); Yoshio Idogawa, Tokyo (JP)

(73) Assignees: NEC Access Technica, Ltd., Kanagawa (JP); NEC Engineering, Ltd., Kanagawa (JP)

( * ) Notice: Subject to any disclaimer, the term of this patent is extended or adjusted under 35 U.S.C. 154(b) by 65 days.

(21) Appl. No.: 13/026,628

(22) Filed: Feb. 14, 2011

(65) Prior Publication Data
US 2011/0210507 A1    Sep. 1, 2011

(30) Foreign Application Priority Data
Feb. 26, 2010    (JP) .................................. 2010-41687

(51) Int. Cl.
*B65H 5/02*    (2006.01)
*B65H 5/04*    (2006.01)

(52) U.S. Cl. ....................................................... 271/274

(58) Field of Classification Search ................... 271/273, 271/274
See application file for complete search history.

(56) References Cited

U.S. PATENT DOCUMENTS

| | | | | | |
|---|---|---|---|---|---|
| 4,015,703 | A | * | 4/1977 | Keller | ............................ 198/624 |
| 5,884,910 | A | * | 3/1999 | Mandel | ......................... 271/296 |
| 6,042,112 | A | * | 3/2000 | Izumi | .............................. 271/273 |
| 6,817,611 | B2 | * | 11/2004 | DiRamio | ........................ 271/273 |
| 7,422,320 | B2 | * | 9/2008 | Sugiura | ......................... 347/104 |
| 7,591,467 | B2 | * | 9/2009 | Terada | ........................... 271/274 |
| 7,942,411 | B2 | * | 5/2011 | Ishioka | ......................... 271/274 |
| 8,113,514 | B2 | * | 2/2012 | Sekino et al. | .................. 271/273 |

FOREIGN PATENT DOCUMENTS

| | | | |
|---|---|---|---|
| JP | 62244834 | A * | 10/1987 |
| JP | 2931347 | B | 8/1999 |
| JP | 2001026335 | A | 1/2001 |
| JP | 2011136803 | A | 7/2011 |

OTHER PUBLICATIONS

Japanese Office Action for JP2010-041687 issued Dec. 27, 2011.

\* cited by examiner

*Primary Examiner* — Kaitlin Joerger

(57) ABSTRACT

The sheet feeding apparatus of the invention includes a driving roller that is rotated by a predetermined driving source, a driven roller that rotates in response to movement of said driving roller, said driven roller being placed opposite said driving roller and having contact with a roller surface of said driving roller, a pressing member that presses a roller surface of said driven roller toward said roller surface of driving roller at a predetermined pressure, and driven roller holding member that includes an opening being elongated in a tangential direction at a contact point between said driven roller and said driving roller or between said driven roller and a sheet, on a circle forming said roller surface of said driven roller.

8 Claims, 6 Drawing Sheets

SHEET FEEDING APPARATUS, DOCUMENT READING APPARATUS AND METHOD FOR FEEDING SHEET

This application is based upon and claims the benefit of priority from Japanese Patent Application No. 2010-041687, filed on Feb. 26, 2010, the disclosure of which are incorporated herein in their entirety by reference.

TECHNICAL FIELD

The invention is related to a sheet feeding apparatus for feeding a paper-shaped sheet, like a document, a document reading apparatus, and a method for feeding a sheet.

BACKGROUND ART

The document reading apparatus, which reads a document by moving the document and scanning an image using a one-dimensional image sensor, requires that the document always moves at a constant speed in an area where the image is read.

In the document reading apparatus, two rollers facing each other pinch the document therebetween, and the document is fed into the apparatus one-by-one by rotating the rollers. The document is conveyed by rotating a pair of rollers, facing each other, which is arranged in the apparatus. The document fed into the apparatus is ejected to the outside of the apparatus by the rotating rollers, starting from a front edge of the document, as reading proceeds.

In case that the document is conveyed as the pair of rollers rotates, when a rear edge of the document separates from the pair of rollers, a gap, corresponding to the thickness of the document, temporarily occurs between the rollers.

As shown in FIG. 8, rollers 118, 119 arranged in an apparatus pinch and convey a document 136. Therefore, at least one roller 119 is pressed by a pressing means 135, like a spring. As shown in FIG. 9, when a rear edge of a document 142 separates from an area between the rollers 118, 119, a gap d temporary occurs. Then, the roller 119 with the pressing means 135 instantly moves a distance of the gap d, and comes into contact with the roller 118. Consequently, the rear edge of the document 142 is pressed and kicked out by the roller 119 to instantly move, and the position of the document 142 rapidly shifts.

When a roller arranged near a document reading device causes rapid shifting of the document separating from the roller, various troubles with image reading occur. For example, a straight line drawn on the document is mistaken for a curved line. In an image area where a gap between parallel lines is narrow, like a Chinese character, the gap is mistaken as being elongated, otherwise the parallel lines are mistaken for one line. Furthermore, when a color image is read out by resolving into three primary colors, color deviation occurs.

In particular, very precise image reading is frequently performed in these days. Therefore, even though speed of the document slightly varies when the document is read out, image quality is seriously deteriorated. The thicker the document becomes, the more serious the troubles of image reading become.

To solve the above-mentioned problems, Japanese granted patent publication No. 2931347 (Patent document 1) discloses a recording apparatus having a clearance between a paper pan and a release plate. The paper pan of the recording apparatus corresponds to a roller supporting member. The release plate corresponds to a member arranged in the apparatus body. In the apparatus, a part of the paper pan extends downwardly to form a rectangular projection, and a rectangular opening is made in the apparatus body. Since the opening is larger than the projection formed on a bottom plate, engagement between the opening and the projection, having a predetermined amount of clearance, is made.

SUMMARY

The purpose of the invention is to provide a sheet feeding apparatus, a document reading apparatus and a method for feeding a sheet, which achieve stable feeding when a rear edge of a sheet, like a document, separates from a pair of feed rollers.

BRIEF DESCRIPTION OF THE DRAWINGS

Exemplary features and advantages of the present invention will become apparent from the following detailed description when taken with the accompanying drawings in which.

EXPLANATION OF THE SYMBOLS

10 SHEET FEEDING APPARATUS
11, 22 DRIVING ROLLER
12, 23 DRIVEN ROLLER
13, 24 PRESSING MEANS
14, 25 DRIVEN ROLLER HOLDING MEANS
20 DOCUMENT READING APPARATUS
21 IMAGE READING MEANS
30 METHOD FOR FEDDING SHEET
31 SHEET FEEDING STEP
32 DRIVEN ROLLER SHIFTING STEP
201 UPPER UNIT
202 DOCUMENT TRAY
203 DIRECTION OF EJECTION
204 DOCUMENT INSERTING PART
206 GUIDE ROLLER
207 MAIN CONVEYING ROLLER

208 FEED ROLLER
209 MIDDLE UNIT
211 RETARD ROLLER
212 EJECTING ROLLER
214 LOWER UNIT
215 PLATEN GLASS
216 FEED ROLLER
217 EJECTING ROLLER
218, 219, 220, 221 FEED ROLLER
230 READING POSITION
231 GUIDE PLATE
242 DRIVEN ROLLER HOLDER
243 OPENING
245 ROTATING SHAFT
246 SUPPORTING CLIP
247 OPENING
248 COMPRESSION SPRING

EXEMPLARY EMBODIMENT

[First Embodiment]

Figure 1:
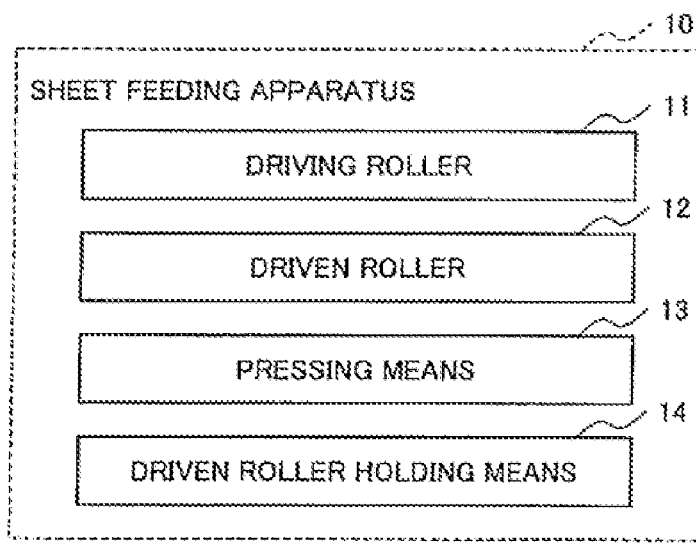
FIG. 1 is a block diagram corresponding to claims on the sheet feeding apparatus of the invention.

FIG. 1 is a diagram corresponding to claims on a sheet feeding apparatus 10. The sheet feeding apparatus 10 of the embodiment includes a driving roller 11, a driven roller 12, a pressing means 13, and a driven roller holding means 14.

The driving roller 11 is driven by a predetermined driving source and rotates at a constant speed. The driven roller 12 is arranged opposite the driving roller 11 and rotates in response to movement of a member which has contact with a roller surface of the driving roller 11. The pressing means 13 presses a roller surface of the driven, roller 12 to the roller surface of the driving roller 11 at a predetermined pressure.

The driven roller holding means 14 holds the driven roller 12. So the driven roller 12 is reciprocably movable within a predetermined range in a tangential direction of a circle which forms the roller surface of the driven roller 23 having contact with the roller surface of the driving roller 23 by the pressing means 13, or forms the roller surface of the driven roller 12 having contact with a sheet during sheet feeding.

Figure 2:
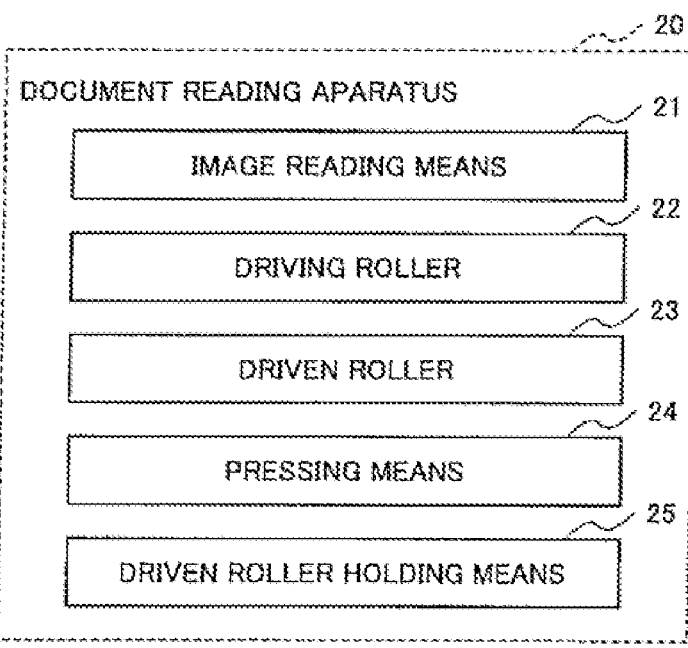
FIG. 2 is a block diagram corresponding to claims on the document reading apparatus of the invention.

FIG. 2 is a diagram corresponding to claims on a document reading apparatus 20. The document reading apparatus 20 of the embodiment includes an image reading means 21, a driving roller 22, a driven roller 23, a pressing means 24, and a driven roller holding means 25.

The image reading means 2 I reads an image, on a line-by-line basis, in a direction perpendicular to a feeding direction of a document to be fed.

The driving roller 22, being placed before the image reading means 21, is driven by a predetermined driving source, and rotates at a constant rate in order to send the document to a position where the image reading means 21 is placed. The driven roller 23, being placed opposite the driving roller 22, rotates in response to movement of a member which has contact with a roller surface of the driving roller. The pressing means 24 presses a roller surface of the driven roller 23 to the roller surface of the driving roller 22 at a predetermined pressure.

The driven roller holding means 25 holds the driven roller 23. So the driven roller 23 is reciprocably movable within a predetermined range in a tangential direction of a circle which forms the roller surface of the driven roller 23 having contact with the roller surface of the driving roller 22 by the pressing means 24, or forms the roller surface of the driven roller 23 having contact with a sheet during sheet feeding.

Figure 3:
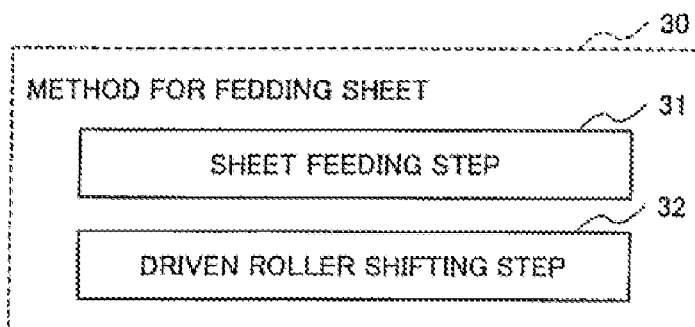
FIG. 3 is a block diagram corresponding to claims on the method for feeding a sheet of the invention.

FIG. 3 is a diagram corresponding to claims on the method for feeding a sheet. The method for feeding a sheet of the embodiment includes a sheet feeding step 31 and a driven roller shifting step 32.

In the sheet feeding step 31, the driven roller is pressed to the driving roller at a predetermined pressure, and a sheet is fed, in a predetermined direction, by driving the driving roller at a constant rate, while pinching the sheet between the rollers.

In the driven roller shifting step 32, when a rear edge of the sheet separates from a position between the driving roller and the driven roller, the driven roller is displacably movable in a direction opposite to a feeding direction of the sheet. The driven roller is moved in the direction opposite to the feeding direction, based on reactive force of force which occurs when the rear edge of the sheet is kicked out, in a predetermined direction, by force moving the driven roller to the driving roller.

[Second Embodiment]

Figure 4:
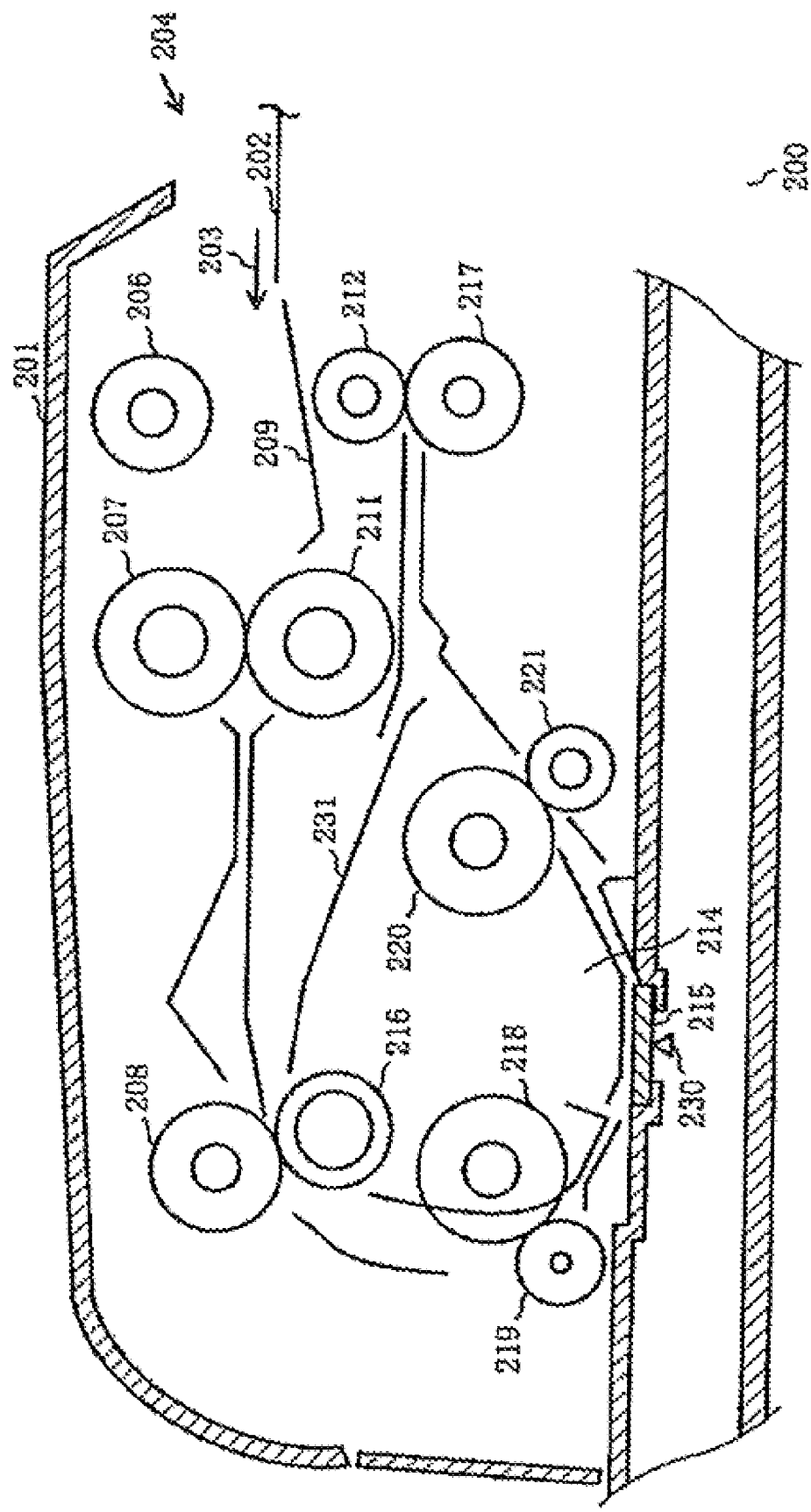
FIG. 4 illustrates a schematic diagram which shows an outline of a configuration, in particular a document feeding system, of the document reading apparatus of the embodiment of the invention.

FIG. 4 shows a configuration of a document reading apparatus 200, in particular a feeding system of a document. The document reading apparatus 200 of the embodiment includes three units, i.e. an upper unit 201, a middle unit 209, and a lower unit 214 in order to form a feeding space for the document.

The upper unit 201 is arranged at the most highest position thereamong. The upper unit 201 includes a document tray 202, a guide roller 206, a main conveying roller 207, and a feed roller 208.

The guide roller 206 is arranged above a document (not shown) which is placed on the document tray 202, feeds the document in a feeding direction, and guides a front edge of the document into the document reading apparatus 200. The main conveying roller 207 and the feed roller 208 convey the document fed by the guide roller 206 into the document reading apparatus 200.

The middle unit 209 is arranged just below the upper unit 201. The middle unit 209 includes a retard roller 211 and an ejecting roller 212 which are rotatable around a supporting point (not shown).

The retard roller 211 has contact with the main conveying roller 207 of the upper unit 201. The retard roller 211 faces the main conveying roller 207. These rollers have contact with one another so that when one of the rollers rotates, the other roller rotates in response to the rotation. The ejecting roller 212 feeds the document into the apparatus again when the document is ejected and both sides of the document are read. The ejecting roller 212 is a driving roller driven by a driving source which is not shown.

The lower unit 214 is arranged further below the middle unit 209. A platen glass 215 is arranged in an opening of a bottom part in the lower unit 214. An apparatus body below the platen glass 215 includes an optical system and a reading element (not shown), which read image information of a document passing on the platen glass 215. The reading element (not shown) corresponds to the image reading means 21.

The lower unit 214 includes a feed roller 216, an ejecting roller 217, and two pairs of feed rollers (218, 219), (220, 221).

The feed roller 216 is placed opposite the feed roller 208 of the upper unit 201, and has contact therewith. The ejecting roller 217 is placed opposite the ejecting roller 212 of the middle unit 209, and has contact therewith. The pair of feed rollers (218, 219) has contact with each other. The pair of feed rollers (220, 221) has contact with each other. The platen glass 215 is located between the two pairs of feed rollers (218, 219), (220, 221).

[Description on Reading Process]

Next, a document feeding process in the document reading apparatus 200 above-mentioned is briefly described. Initially, a process of reading only one side of the document is described.

The document is set on the document tray 202. Then, the guide roller 206 moves downward to touch the most upper face of the document. The document is fed toward a nip area between the main conveying roller 207 and the retard roller 211.

The nip area means an area where facing two rollers have contact with each other. The nip area in the embodiment means the area where the main conveying roller 207 and the retard roller 211 have contact with each other.

The main conveying roller 207 and the retard roller 211 feed the document into the apparatus (leftward in FIG. 4) on a sheet-by-sheet basis. The retard roller 211 rotates in a direction opposite to a rotating direction of the main conveying roller 207 to prevent stacked documents from being fed at one time.

The document, passing between the main conveying roller 207 and the retard roller 211, passes between the feed rollers 208, 216, and passes between the feed rollers 218, 219 to be conveyed on the platen glass 215.

Then, image information of the first side of the document is read at a reading position 230 by the reading element (not shown). The document, after passing between the pair of feed rollers (220, 221), passes between the pair of ejecting rollers (212, 217) to be ejected to a stacker (not shown) placed in the outside of the document reading apparatus 200.

As mentioned above, the documents on the document tray 202 are fed into the document reading apparatus 200 on a sheet-by-sheet basis, and image information of one side (upper side of the document set on the document tray 202) of each of the documents is read.

Next, a process of reading both sides of the document is described.

When both sides of the document are read, the document is fed into the document reading apparatus 200 from the document tray 202, and image information of the first side thereof is read like above one side reading. The document is fed to the stacker (not shown) by the pair of ejecting rollers 212, 217, starting from the front edge thereof, as the reading proceeds. Then, the first side which has been read is the downside of the document.

When the rear edge of the document reaches the nip area of the pair of ejecting rollers 212, 217, the pair of ejecting rollers 212, 217 start to rotate inversely. Then, the rear edge of the document moves toward the pair of feed rollers 208, 216 while being guided by a guide plate 231 which is located above the feed roller 220, and passes between the feed rollers 208, 216.

The document passes between the pair of feed rollers 218, 219 again, and is transferred on the platen glass 215. Then, the reading element (not shown) reads image information of the second side of the document.

Passing between the pair of feed rollers 220, 221, the document passes between the pair of ejecting rollers 212, 217 to be ejected on the stacker. As described above, image information of the both sides of the document is read.

Figure 5:
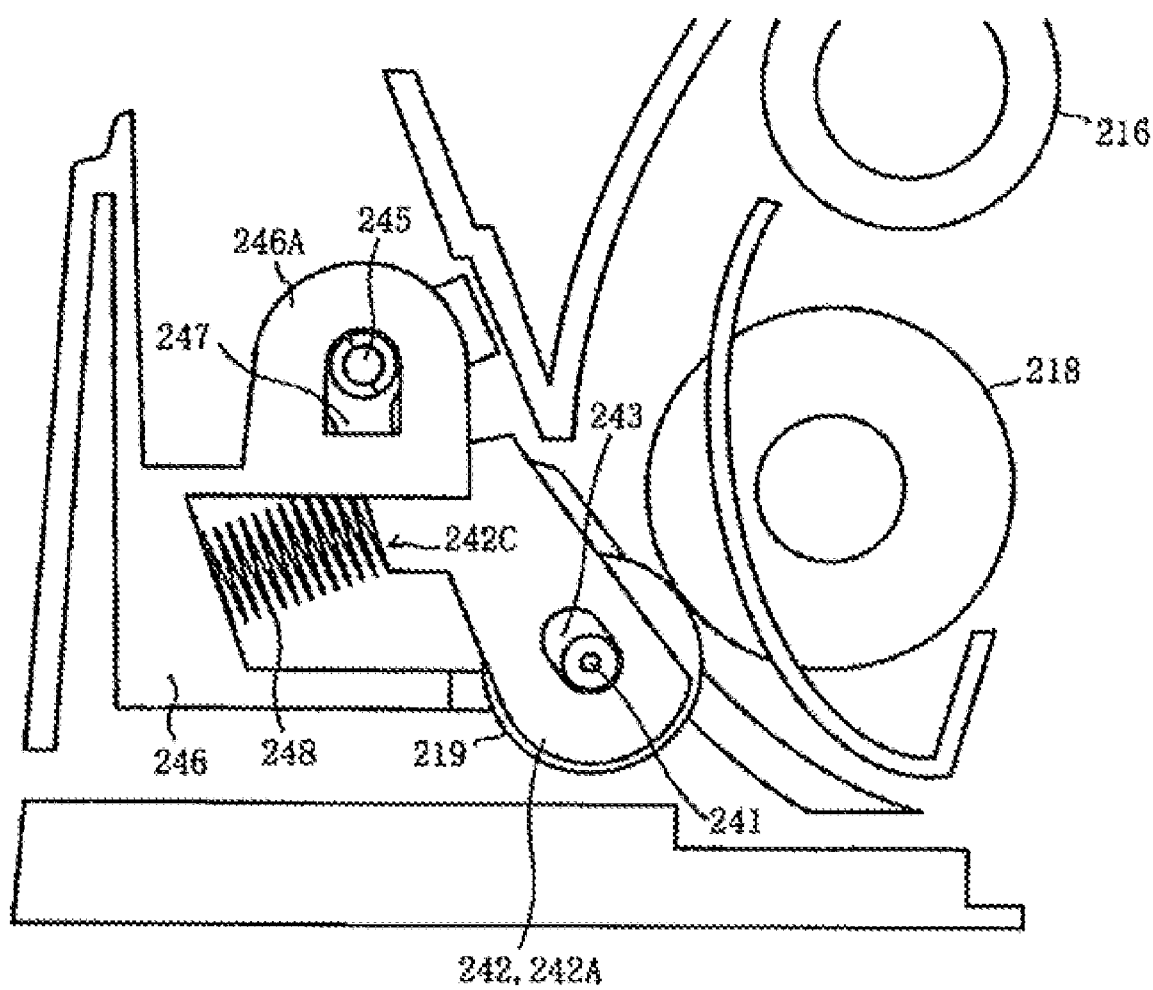
FIG. 5 is a schematic diagram illustrating a neighboring area of a pair of feed rollers which arranged before a platen glass of the embodiment.

Next, in FIG. 5, a peripheral configuration around the pair of feed rollers 218, 219 of the embodiment, being located before the platen glass 215, is described in detail.

The driving source provides the feed roller 218, being rotatably placed at a predetermined position in the apparatus body, with rotating force. The feed roller 218 corresponds to the driving rollers 11, 22. The feed roller 219 does not connect to the driving source, but has contact with the feed roller 218. The feed roller 219 rotates in response to rotation of the feed roller 218. The feed roller 219 corresponds to the driven rollers 12, 23.

The feed roller 219 is rotatably held by a driven roller holder 242. That is, the feed roller 219 is held by the driven roller holder 242 so that a movable range thereof may be limited.

A thickness (width) of the feed roller 218 may cover a whole width of a feeding path for feeding the document. In the embodiment, a plurality of the feed rollers 218 each having relatively narrow width may be arranged at predetermined intervals in a direction orthogonal to a document feeding direction.

In the configuration above-mentioned, a plurality of the driven feed rollers 219 corresponding to each of the driving feed rollers 218 need to be arranged. In FIG. 5, one pair of the feed rollers 218, 219 is shown.

Next, the driven roller holder 242, i.e. the driven roller holding means 14, 25, is described in detail.

The driven roller holder 242 is formed by bending one metal plate to be nearly U-shaped. The U-shaped driven roller holder 242 includes metal plate parts 242A and 242B, which face one another and are symmetrically arranged at a predetermined distance (the metal plate part 242B is not shown in FIG. 5).

Each of the metal plate parts 242A and 242B in the driven roller holder 242 includes an opening 243. The openings 243, being arranged at a lower part of each of the parts 242A and 242B, face one another. A rotating shaft 241 of the feed roller 219 is rotatably arranged through the pair of openings 243. The rotating shaft 241 is reciprocably movable within the openings 243 in a longitudinal direction thereof.

A rotating shaft 245 is arranged at an upper part of each of the metal plate parts 242A and 242B to penetrate therethrough. The rotating shaft 245 is rotatably held by an opening 247 of a supporting clip 246.

The supporting clip 246 is formed by bending one metal plate to be nearly

U-shaped. The U-shaped supporting clip 246 includes metal plate parts 246A and 246B, which face one another and are symmetrically arranged at a predetermined distance.

Each of the metal plate parts 246A and 246B in the supporting clip 246 includes the opening 247. The openings 247 face one another. The rotating shaft 245 is rotatably arranged, penetrating through the pair of openings 247. The rotating shaft 245 is reciprocably movable within the openings 247 in a longitudinal direction thereof.

The longitudinal direction of the openings 243, 247, each having an elongated shape, is parallel or nearly parallel to a feeding direction of a document 261 which passes between the pair of feed rollers 218, 219. That is, each of the openings 243, 247 is elongated in a tangential direction of a circle forming a surface of the feed roller 219. The supporting clip 246 connects the driven roller holder 242 with a frame of a body of the document reading apparatus 20.

A compression spring 248 is arranged between a connecting part 242C connecting the metal plate parts 242A, 242B, and the supporting clip 246, and connects the connecting part 242C and the supporting clip 246. The compression spring 248 corresponds to the pressing means 13. The feed roller 219 constantly faces force from the compression spring 248. The force rotates the feed roller 219 around the rotating shaft 245, as a fulcrum, at a predetermined pressure, toward the feed roller 218.

[Descriptions on Operation]

Figure 6:
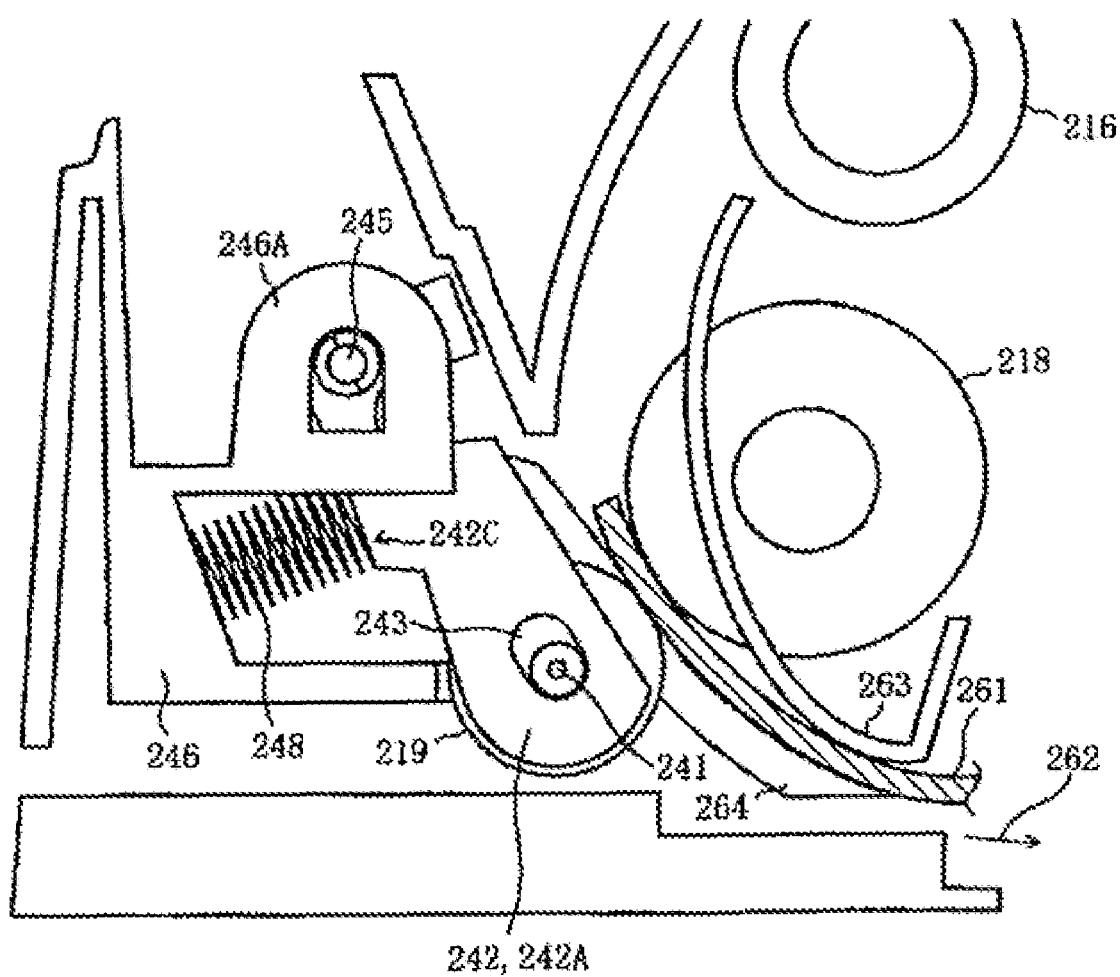
FIG. 6 is a schematic diagram illustrating an aspect in which a document is ejected from the pair of feed rollers arranged just before the platen glass of the embodiment.
Figure 7:
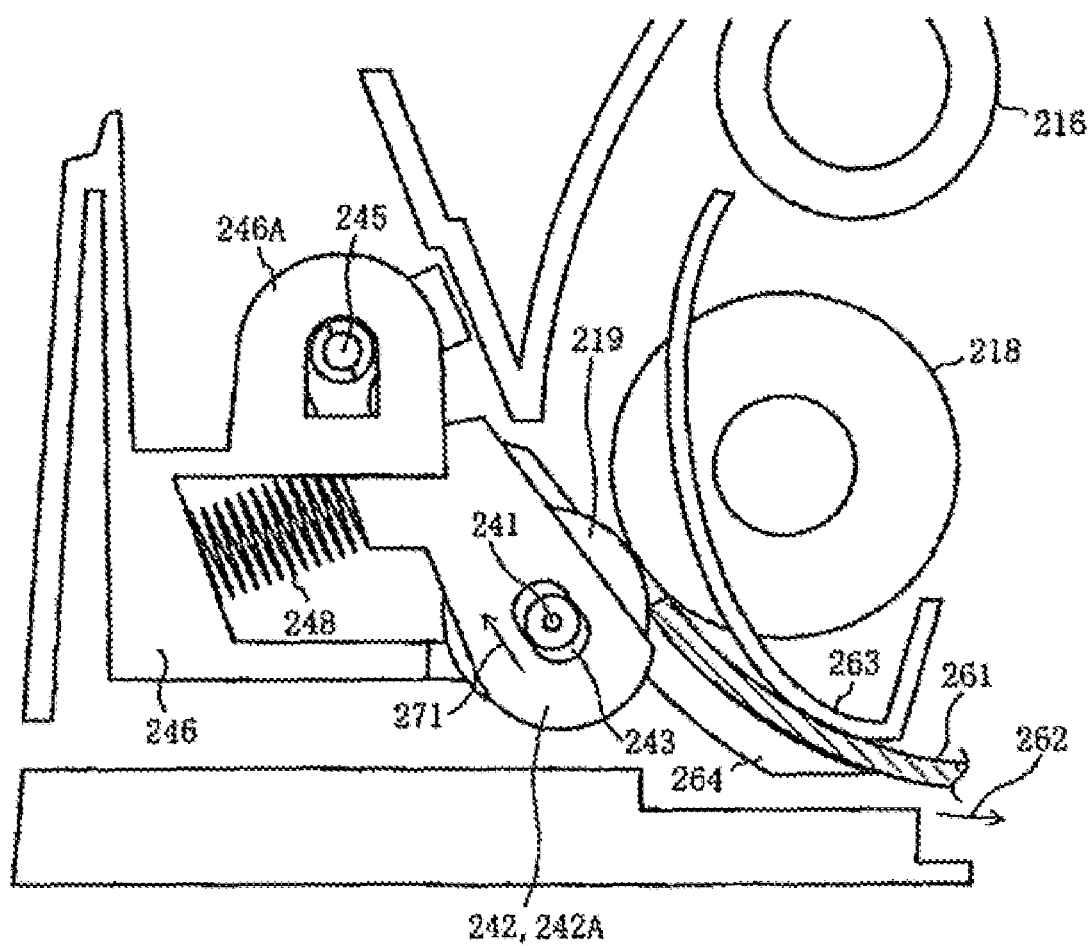
FIG. 7 is a schematic diagram illustrating a state shortly after a rear edge of the document separates from a nip area of the pair of feed rollers just after the time point shown in FIG. 6.
Figure 8:
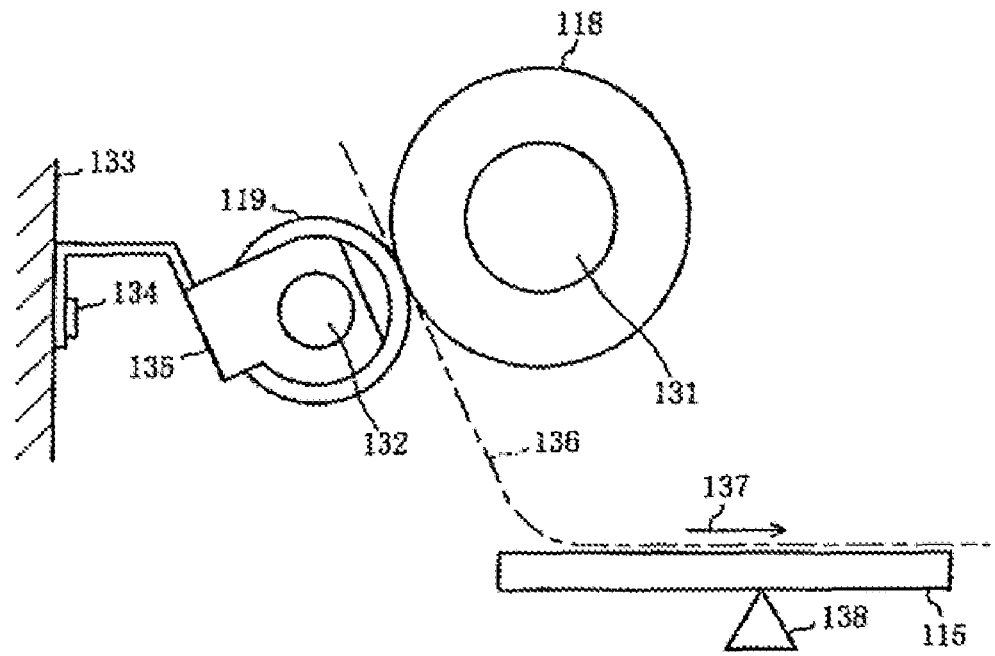
FIG. 8 is a schematic diagram of a main part of a relation of a reading position for the document and a pair of feed rollers therebefore disclosed in Japanese granted patent publication No. 2931347.

FIG. 6 illustrates a state in which the document 261 is sent by the pair of feed rollers 218, 219 being arranged just before the platen glass. In FIG. 6 and FIG. 7, the thickness of the document is exaggerated in order to make descriptions on the operation of the embodiment understandable.

In FIG. 6, the document 261 is pinched in the whole nip area of the pair of feed rollers 218, 219, and is fed in a direction of an arrow 262 (feeding direction) at a constant speed. As shown in FIG. 4, the document 261 slides on the platen glass 215, and images are read at the reading position 230 for images on a line-by-line basis.

The driving feed roller 218 rotates in a counterclockwise direction at a constant speed to feed the document 261 having contact therewith in the nip area, in the direction of the arrow 262 (feeding direction). The above operation corresponds to the sheet (document) feeding step 31.

The driven feed roller 219 presses the document 261 in the nip area by the compression spring 248. The driven feed roller 219, therefore, rotates in a clockwise direction in response to rotation of the driving feed roller 218 to send the document 261 in the direction of the arrow 262.

While the document 261 is fed, the driven feed roller 219 is subjected to force from the driving feed roller 218 in an obliquely downward direction. Therefore, the rotating shaft 241 is displaced to the lowest position in the opening 243. The feed roller 219, being located at the position, continues to feed the document 261. The document 261 passes between a pair of guide plates 263, 264, images thereof are read at the reading position 230.

Shortly after the rear edge of the document 261 separates from the nip area of the pair of feed rollers (218, 219,) following the time point of FIG. 6, the document and the feed rollers are located at the positions shown in FIG. 7. The longitudinal direction of the opening 243 in the metal plate part 242A is parallel or nearly parallel to the feeding direction of the document 261 passing between the pair of rollers 218, 219. That is, the longitudinal direction of the opening 243 corresponds approximately to the tangential direction of the circle forming the surface of the feed roller 219.

When the rear edge of the document 261 is ejected from the nip area of the pair of feed rollers (218, 219), the driven feed roller 219 instantly moves a distance of the thickness of the document toward the driving feed roller 218.

If the driven roller holder 242 does not have the opening 243 where the rotating shaft 241 can be displaced therewithin, the rear edge of the document 261 faces force by which the document 261 is kicked out from the nip area of the pair of feed rollers 218, 219 in the direction of the arrow 262, based on movement of the feed roller 219.

Figure 9:
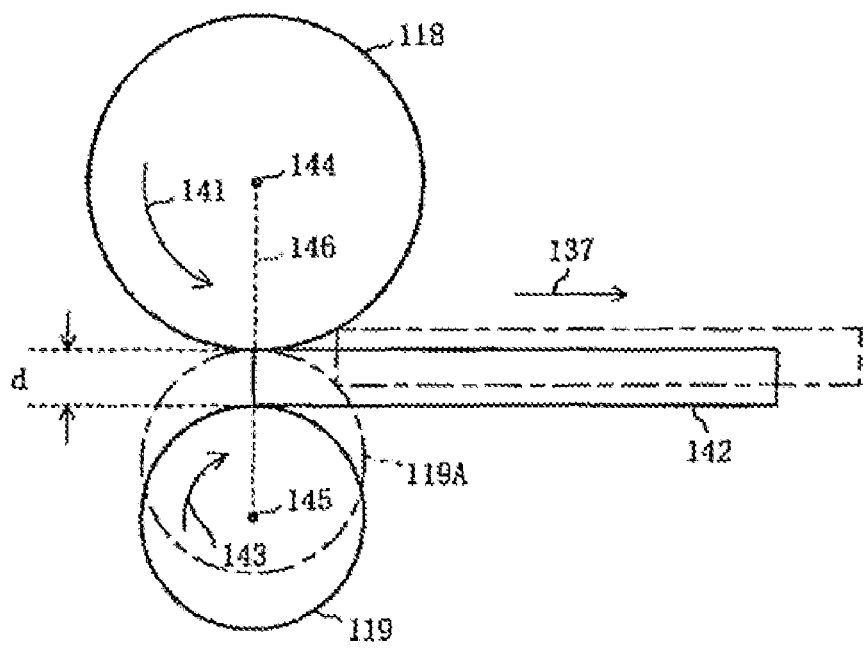
FIG. 9 illustrates performance in which a rear edge of the document separates from the pair of feed rollers disclosed in Japanese granted patent publication No. 2931347.

As shown in FIG. 9, in the document reading apparatus of the background art above-mentioned, a center 145 of the driven feed roller 119 can move only on a straight line 146 between the center 145 thereof and a center 144 of the driving feed roller 118. Therefore, when the feed roller 119 moves to the feed roller 118, the rear edge of the document 142 faces all of force which is generated in a direction orthogonal to a direction of movement of the feed roller 119. Accordingly, the rear edge of the document 142 is ejected in a direction of an arrow 137 at a speed higher than a normal feeding speed.

In the document reading apparatus 20 of the embodiment, the opening 243 having an elongate shape holds the rotating shaft 241 of the driven feed roller 219 so that the shaft 241 is reciprocably movable in a longitudinal direction thereof. Therefore, when the rear edge of the document 261 is ejected, the driven feed roller 219 presses the rear edge of the document 261 in the direction of the arrow 262. At the same time, the rotating shaft 241 shifts in a direction of an arrow 271, being a direction opposite to the arrow 262, based on the principle of action and reaction.

The force, pressing the rear edge of the document 261 in the direction of the arrow 262 (feeding direction), is substantially reduced, since the rotating shaft 241 of the driven feed roller 219 is displaced in a direction opposite to the ejecting direction for the document 261. Then, the operation above-described corresponds to the driven roller shifting step 32.

If the gap between the pair of guide plates 263, 264 gives temporary curl to the edge of the document 261, rapid change of the feeding speed in the direction of the arrow 262 may be suppressed. Consequently, an image blur, at the image reading position 230, of the document 261 which is located on the platen glass 215 shown in FIG. 4, can be kept within an allowable range.

[Description on Advantage]

In the document reading apparatus 20 of the embodiment having the configuration above described, the change of feeding speed of the document at the image reading position 230 (FIG. 4) in a vertical scanning direction can be minimally-suppressed. Even if the document 261 is thick, image quality deterioration at a particular position thereof can be also minimally-suppressed.

In the document reading apparatus 20 of the embodiment, the driven roller holder of the driven feed roller 219 includes only the opening 243 in which the rotating shaft is reciprocably movable. Therefore, the apparatus 20 has the advantages of a simple structure, low cost, and high reliability. The sheet feeding apparatus 10, like the document reading apparatus 20, can be manufactured at low cost, compared with a sheet feeding apparatus having a complex mechanism making feeding speed of the document 261 on a feeding path constant.

Because it is unnecessary to shill a large member, like the paper pan described in the Patent document 1, the apparatus of the invention can be downsized. According to the embodiment, stable loading (pressure) is achieved since a driven roller holding member facing spring load is not displaced.

The related art using the paper pan described in the Patent document 1 includes problems that pressure between feed rollers is indefinite and unstable since the paper pan itself moves.

The document 261 rotates the driven feed roller 219 clockwise during feeding thereof. Therefore, the rotating shaft 241 of the feed roller 219 is displaced to the lowest position in the opening 243 and rotates thereat. The feed roller 219 instantly moves a distance of the thickness of the document 261 toward the feed roller 218, when the rear edge of the document 261 separates from the feed rollers 218, 219.

The rotating shaft 241 moves a predetermined distance in the direction of the arrow 271 within the opening 243 by reactive force opposite to force pushing the document 261. The length of the opening 243 is arranged depending on thickness of the document to be processed, feeding speed, strength of the compression spring 248, and the like. The lowest position, to which the rotating shaft 241 shifts in the opening 243, is arranged at a position where the pair of feed rollers (218, 219) efficiently works for feeding of the document 261.

In the above embodiment, the driven roller shaft 241 of the feed roller 219 nearest to the platen glass 215 on the feeding path is formed so that the shaft is movable in the feeding direction for the document 261. However, the invention is not limited to such configuration. Regarding one or more driven feed rollers which still feed the document 261 on the feeding path when the front edge of the document 261 reaches the reading position 230, the driven roller holders thereof may include openings in which the shaft of the driven roller is reciprocably movable in the feeding direction.

The embodiment is applicable to a sheet feeding apparatus 100 without the image reading means 21. When a rear edge of a sheet separates from the nip area of the pair of feed rollers, the sheet feeding apparatus 100 prevents the rear edge of the sheet from being kicked out and prevents a document position from being rapidly displaced.

The invention is applicable not only to the opening 243 of the driven roller holder 242 but also to the opening 247 of the supporting clip 246.

The opening 247 of the holding clip 246, into which the rotating shaft 245 of the driven roller holder 242 is inserted, has a shape similar to that of the opening 243. Since the longitudinal direction of the opening 247 is parallel or nearly parallel to the feeding direction of the document 261 (tangential direction of the feed roller) passing between the pair of rollers 218, 219, rapid displacement of the position of the document 261 may be prevented.

In the above case, it is preferable that the longitudinal direction of the opening 247 corresponds or nearly corresponds to the feeding direction of the document, like that of the opening 243. The driven roller moves a distance of the gap corresponding to the thickness of the document, when the document separates from the document feeding rollers. The driven roller and the driven roller holder may prevent change of the feeding speed due to the movement of the driven roller, in an integrated manner.

The embodiment achieves stable feeding of the document at the time of reading the document. Further, the invention is effective for stable feeding at the time of recording the document. The invention is applicable not only to a document feeding device used in a facsimile apparatus, a copy machine, and an integrated machine thereof, but to various general recording devices.

A part of or all of the embodiment mentioned above may be described as follows.

The sheet feeding apparatus of the invention includes a driving roller for being rotated by a predetermined driving source, a driven roller that is placed opposite the driving roller, has contact with a roller surface thereof, and rotates in response to movement of the driving roller, pressing means that press a surface of the driven roller toward the roller surface of the driving roller at a predetermined pressure, and a driven roller holding means that hold the driven roller so that the driven roller is reciprocably movable within a predetermined range in a tangential direction at the roller surface of the driven roller which has contact with the roller surface of the driving roller by the pressing means or in a tangential direction at the roller surface of the driven roller which has contact with a sheet being currently fed by the pressing means.

The related art using the paper pan described in the Patent document 1 includes problems that pressure between feed rollers is indefinite and unstable since the paper pan itself moves.

An exemplary advantage according to the invention is that the sheet feeding apparatus, the document reading apparatus and the method for feeding a sheet according to the invention achieve stable feeding when the rear edge of the sheet, like a document, separates from the pair of feed rollers.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A sheet feeding apparatus, comprising:
   a driving roller that is rotated by a predetermined driving source;
   a driven roller that rotates in response to movement of said driving roller, said driven roller being placed opposite said driving roller and having contact with a roller surface of said driving roller;
   a pressing member that presses a roller surface of said driven roller toward said roller surface of driving roller at a predetermined pressure; and
   a driven roller holding member that includes an opening being elongated in a direction parallel to a tangential direction at a contact point between said driven roller and said driving roller or between said driven roller and a sheet, on a circle forming said roller surface of said driven roller, wherein said opening holds a rotating shaft of said driven roller, and said driven roller holding member holds said driven roller so that said driven roller is reciprocably movable within a predetermined range in said direction parallel to said tangential direction, and said pressing member applies a predetermined pressure to said driven roller in a direction where said driving roller is arranged, by using a spring member, one end of which is fixed to said driven roller holding member.

2. The sheet feeding apparatus of claim 1, wherein said opening is held by said driven roller holding member.

3. The sheet feeding apparatus of claim 1, wherein said opening is arranged at a position where said rotating shaft of said driven roller is held and at a position where said driven roller holding member is fixed.

4. A document reading apparatus, comprising:
   an image reading member that reads a document to be fed;
   a driving roller that is rotated by a predetermined driving source and that sends said document to a position at which said image reading member is arranged, said driving roller being arranged before said image reading member;
   a driven roller that rotates in response to movement of said driving roller, said driven roller having contact with a roller surface of said driving roller and being arranged opposite said driving roller;
   a pressing member that presses a roller surface of said driven roller toward said roller surface of said driving roller at a predetermined pressure; and
   a driven roller holding member that includes an opening being elongated in a direction parallel to a tangential direction at a contact point between said driven roller and said driving roller or between said driven roller and a sheet, on a circle forming said roller surface of said driven roller, wherein said opening holds a rotating shaft of said driven roller, and said driven roller holding member holds said driven roller so that said driven roller is reciprocably movable within a predetermined range in said direction parallel to said tangential direction, and said pressing member applies a predetermined pressure to said driven roller in a direction where said driving roller is arranged, by using a spring member, one end of which is fixed to said driven roller holding member.

5. The document reading apparatus of claim 4, wherein said opening is held by said driven roller holding member.

6. The document reading apparatus of claim 4, wherein said opening is arranged at a position where said rotating shaft of said driven roller is held and at a position where said driven roller holding member is fixed.

7. The document reading apparatus of claim 4, wherein said driven roller holding member holds said driven roller so that said driven roller is reciprocably movable within a predetermined range in said tangential direction.

8. The document reading apparatus of claim 7, wherein a plurality of said driven rollers being held by said driven roller holding member is located on a feeding path between a front edge of said document and a rear edge of said document, when said front edge reaches an image reading position of said image reading member.

* * * * *